US011219948B2

(12) United States Patent
Mazet

(10) Patent No.: US 11,219,948 B2
(45) Date of Patent: Jan. 11, 2022

(54) METHOD ALLOWING THE REMOVAL OF OXIDES PRESENT ON THE SURFACE OF NODULES OF A METAL POWDER BEFORE USING SAME IN AN INDUSTRIAL METHOD

(71) Applicant: ADDUP, Cebazat (FR)

(72) Inventor: Thierry Mazet, Nancy (FR)

(73) Assignee: AddUp, Cebazat (FR)

( * ) Notice: Subject to any disclaimer, the term of this patent is extended or adjusted under 35 U.S.C. 154(b) by 606 days.

(21) Appl. No.: 15/743,325

(22) PCT Filed: Jul. 8, 2016

(86) PCT No.: PCT/EP2016/066363
§ 371 (c)(1),
(2) Date: Jan. 10, 2018

(87) PCT Pub. No.: WO2017/009264
PCT Pub. Date: Jan. 19, 2017

(65) Prior Publication Data
US 2018/0221946 A1 Aug. 9, 2018

(30) Foreign Application Priority Data
Jul. 10, 2015 (FR) ...................................... 1556635

(51) Int. Cl.
*C23F 1/32* (2006.01)
*B22F 1/00* (2006.01)
(Continued)

(52) U.S. Cl.
CPC .......... *B22F 1/0088* (2013.01); *B22F 1/0085* (2013.01); *B22F 12/00* (2021.01);
(Continued)

(58) Field of Classification Search
CPC ........ B22F 1/00; B22F 1/0081; B22F 1/0088; B22F 2001/0092; B22F 2202/15;
(Continued)

(56) References Cited

U.S. PATENT DOCUMENTS 3,000,919 A   9/1961  Wetroff et al. ............... 260/448
3,380,822 A * 4/1968  Kelly ...................... H01M 4/02
                                                          419/36
(Continued)

FOREIGN PATENT DOCUMENTS

CN   1074842 A  *  8/1993
EP   0 219 230 A1   4/1987
(Continued)

OTHER PUBLICATIONS

FR 1472777 machine translation of the description (Year: 1967).*
(Continued)

*Primary Examiner* — George Wyszomierski
(74) *Attorney, Agent, or Firm* — Venable LLP

(57) ABSTRACT

A method and a device are provided for removing surface oxides on nodules of a metal powder, before the nodules of the metal powder are used in an industrial process in which the nodules of the metal powder are assembled via a solid route or via a liquid route. In the method and the device, the surface oxides are stripped from the nodules of the metal powder by bringing the nodules of the metal powder into contact with vapour from at least one of: sublimation of a stripping solid material, and sublimation of the stripping solid material followed by a chemical transformation of a product of the sublimation.

14 Claims, 3 Drawing Sheets

(51) Int. Cl.
*C23G 5/00* (2006.01)
*B22F 12/00* (2021.01)
*C09K 13/08* (2006.01)
*B33Y 30/00* (2015.01)
*B22F 10/10* (2021.01)

(52) U.S. Cl.
CPC ............... *C09K 13/08* (2013.01); *C23F 1/32* (2013.01); *C23G 5/00* (2013.01); *B22F 10/10* (2021.01); *B22F 2201/01* (2013.01); *B22F 2201/11* (2013.01); *B22F 2999/00* (2013.01); *B33Y 30/00* (2014.12); *Y02P 10/25* (2015.11)

(58) Field of Classification Search
CPC ...... C23F 1/00; C23F 1/10; C23F 1/12; B44C 1/22; B44C 1/221; B44C 1/222; B44C 1/224; B44C 1/225; B44C 1/227; B44C 1/228; C09K 13/00; C09K 13/02; C09K 13/04; C09K 13/06; C09K 13/08; C09K 13/10; C09K 13/12; H01L 21/311; H01L 21/311105; H01L 21/31111; H01L 21/31116; H01L 21/31122; H01L 21/31127; H01L 21/31133; H01L 21/31138
USPC .......................................................... 216/73
See application file for complete search history.

(56) References Cited

U.S. PATENT DOCUMENTS

| | | | | |
|---|---|---|---|---|
| 3,764,373 A | * | 10/1973 | Speirs et al. | C23C 10/34 427/253 |
| 3,971,657 A | * | 7/1976 | Daver | B01D 39/2034 419/2 |
| 4,508,563 A | | 4/1985 | Bernard et al. | 75/0.5 BB |
| 4,676,949 A | | 6/1987 | Miyashita et al. | |
| 5,190,596 A | * | 3/1993 | Timsit | B23K 35/286 148/23 |
| 5,538,709 A | * | 7/1996 | Mohri | C01F 7/30 423/625 |
| 9,555,474 B2 | | 1/2017 | She et al. | |
| 2008/0011124 A1 | * | 1/2008 | Loffelholz | B22F 9/22 75/245 |
| 2010/0064852 A1 | * | 3/2010 | Zhang | C22B 34/1286 75/366 |
| 2016/0175930 A1 | | 6/2016 | She et al. | |

FOREIGN PATENT DOCUMENTS

| | | |
|---|---|---|
| FR | 1 190 669 | 10/1959 |
| FR | 1 472 777 | 3/1967 |
| FR | 1472777 * | 3/1967 |
| FR | 2 727 322 A1 | 5/1996 |
| GN | 1074842 A | 8/1993 |
| GN | 105377476 A | 3/2016 |
| JP | 62-74001 A | 4/1987 |
| JP | 1-166900 A | 6/1989 |
| JP | 3-180269 | 8/1991 |
| JP | 4-187705 A | 7/1992 |
| WO | WO 92/01825 A1 | 2/1992 |
| WO | 2015/023439 A1 | 2/2015 |

OTHER PUBLICATIONS

"André de Haan, Process Technology—An Introduction, 2015, De Gruyter, 72-78" (Year: 2015).*
International Search Report issued by WIPO dated Oct. 17, 2016, in connection with International Application No. PCT/EP2016/066363 (with English translation attached).
Written Opinion published by WIPO dated Jan. 19, 2017, in connection with International Application No. PCT/EP2016/066363 (in French; no English translation presently is available).

* cited by examiner

METHOD ALLOWING THE REMOVAL OF OXIDES PRESENT ON THE SURFACE OF NODULES OF A METAL POWDER BEFORE USING SAME IN AN INDUSTRIAL METHOD

FIELD OF THE INVENTION

The present invention relates to a method and to a device which make it possible to remove the layer of oxides covering the nodules of a metal powder or the spots of oxides present at the surface of the said nodules. It is implemented prior to the use of the metal powder in an industrial process for the assembling of powder by the solid route, such as sintering, or by the liquid route, such as the additive manufacture by fusion of powder, for which the presence of oxides at the surface of the nodules constitutes an obstacle to the satisfactory progression of the industrial process and can damage the quality of the part. It applies very particularly to metal powders formed of oxygen hungry metals, such as aluminium, titanium, zirconium, chromium, niobium, tantalum, molybdenum and their alloys, and more generally those whose preparation does not involve the liquid route.

RELATED ART

The metal powder can be composed of nodules all having the same composition or of a mixture of nodules having at least two different compositions. For example, it can be a powder formed of aluminium nodules or of a mixture of aluminium nodules and nickel nodules.

Some metals, such as aluminium, are very oxygen hungry. In the open air, their surface is instantaneously covered with a thin film of oxides which, during assembling operations, requiring the adhesion of the nodules to one another or the fusion thereof, is harmful to the quality of the bonding. The said layer may then be sufficiently resistant to maintain, in its oxide gangue, the liquid phase formed during these operations. The metal powder can be prepared under a partial vacuum or under an inert atmosphere, so as to prevent and/or limit the presence of oxidizing entities close to the material, in particular when it is brought to high temperature. However, it is in practice virtually impossible to keep this metal powder in a state of non-oxidation, in particular when the industrial process implementing the said powder is carried out under air. Thus, the metal powder of these metals in general oxidized during the use thereof.

BRIEF DESCRIPTION OF EMBODIMENTS OF THE INVENTION

The present invention makes it possible to overcome this problem by making it possible to remove the layer of oxides covering the nodules of a metal powder or the spots of oxides present at the surface of the said nodules, at the time of their use in an industrial process, thus making it possible to obtain parts which have high mechanical characteristics and/or reinforced properties and which are devoid of traces of oxides.

The invention consists in particular of a method which makes it possible to remove the oxides present at the surface of nodules of a metal powder before or during the use of the latter in an industrial process for the assembling of metal powder by the solid or liquid route, characterized in that it consists in stripping the said metal powder by bringing the latter into contact with vapour obtained by sublimation of a stripping solid material and/or by sublimation of a stripping solid material followed by a chemical transformation. In the art, the stripping solid material is generally known as "flux".

The stripping solid material, or flux, is heated in order to be sublimed; it can subsequently undergo a chemical transformation, for example the decomposition of the starting molecule of the flux to give other distinct molecules. In what follows, the terms "sublimed stripping solid material" and "stripping solid material vapour" will be used without distinction to denote the product resulting from the sublimation of the stripping solid material and/or the product resulting from the sublimation of the stripping solid material followed by a chemical transformation.

According to an example of embodiment of the invention, the stripping solid material is a halide, for example $NH_4F$. It is brought, at atmospheric pressure, to a temperature of approximately 200° C. in order to cause it to sublime. The chemical transformation of the $NH_4F$ can, for example, result in the formation of $AlF$ and of $AlF_3$. According to another example of embodiment of the invention, the stripping solid material is $K_3AlF_6$—$KAlF_4$ brought to a temperature of approximately 400° C. at atmospheric pressure in order to cause it to sublime. These two examples of stripping solid materials or flux are in particular adapted to the stripping of aluminium. The sublimation temperature is reduced when the chamber in which the flux is placed is placed under a pressure of less than atmospheric pressure.

Advantageously, the vapour obtained by sublimation of a stripping solid material and/or by sublimation of a stripping solid material followed by a chemical transformation is entrained by a carrier gas, for example argon. The use of a carrier gas makes it possible to have available a carrier gas plus stripping solid material vapour total flow rate which is greater and thus easier to regulate in flow rate and pressure.

According to an example of embodiment of the invention, the carrier gas circulating between the nodules of the metal powder and the said metal powder constitute a fluidized bed.

The invention also consists of a device which makes it possible to implement the method described above.

This device comprises a container in which the stripping solid material is placed, a means supplying the heat which makes it possible to sublime the stripping solid material, and a means which makes possible contact between the stripping solid material vapour and the metal powder.

The means which makes possible contact between the stripping solid material vapour and the metal powder may simply be based on the proximity of the stripping solid material nodules to the nodules of the metal powder.

The means which makes possible contact between the stripping solid material vapour and the metal powder may also be a distributor plate on which the metal powder rests, the said distributor plate being traversed by stripping solid material vapour.

The means which makes possible contact between the stripping solid material vapour and the metal powder may be the falling of a rain of metal powder into an ascending stream of stripping solid material vapour.

According to an example of embodiment of the invention, the device according to the invention comprises a first container in which the stripping solid material is placed, a means making it possible to sublime the said stripping solid material, a device carrying the stripping solid material vapour towards a second container in which the metal powder is placed. The said containers can constitute only a single container having at least two compartments, a first compartment where the stripping solid material is located and a second compartment where the metal powder is located.

According to one embodiment, the device comprises means making it possible to obtain a fluidized bed in the container where the metal powder is located by the flow of the stripping solid material vapour between the nodules of the metal powder.

The device comprises a means for collecting the gases at an outlet of the container where the metal powder is stripped in order to provide for the confinement and/or the treatment thereof in order to neutralize the polluting components of the said gases.

The invention also consists of an additive manufacturing machine comprising a device as described above making it possible to implement the method according to the invention.

BRIEF DESCRIPTION OF THE DRAWINGS

The characteristics and advantages of the invention will become apparent on reading the description which will follow, given solely by way of example and without limitation, with reference to the following appended figures.

DETAILED DESCRIPTION OF EMBODIMENTS OF THE INVENTION

In order to simplify the description, the metal powder to be prepared for the purpose of the use thereof in an industrial process will be regarded below as consisting of nodules having the same composition. Nevertheless, the invention also applies to metal powder having nodules of different composition and/or dimensions.

Figure 1:
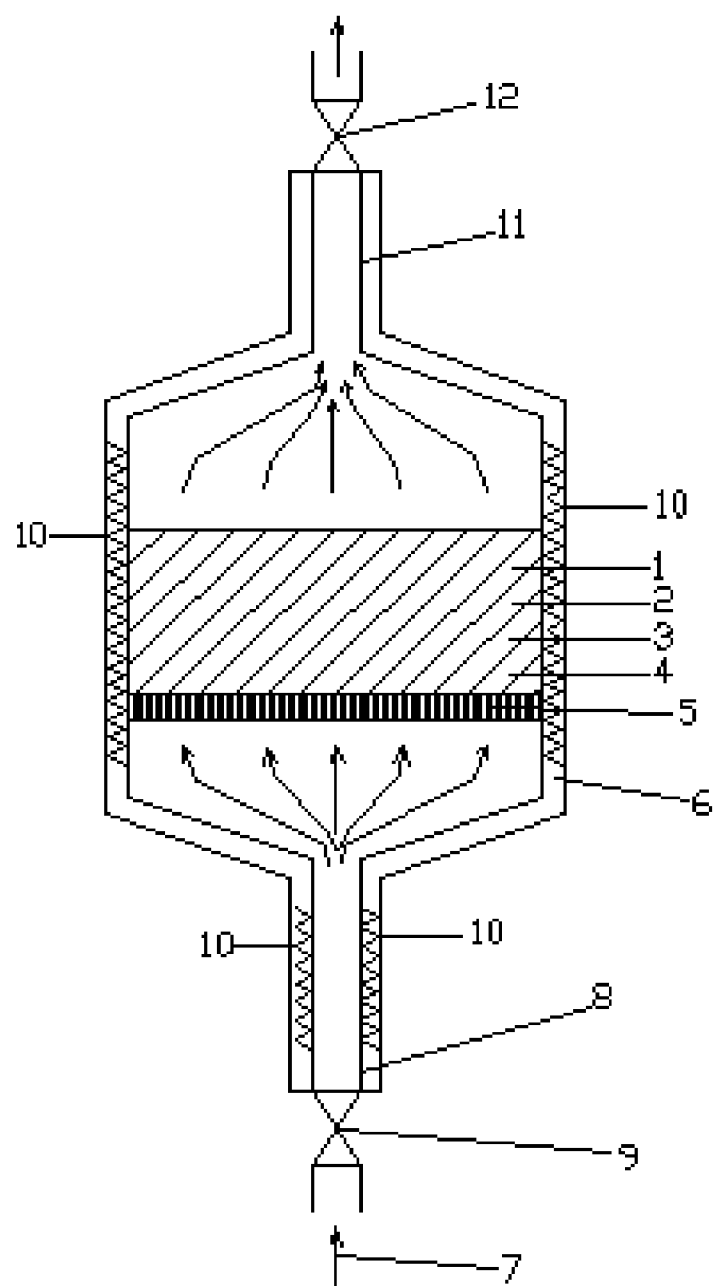
FIG. 1: diagrammatic representation of a first example of device according to the invention.

A first embodiment of the invention can be seen represented in FIG. 1. A mixture, composed of nodules 1 of a metal powder 2 to be prepared for the purpose of the use thereof in an industrial process and of nodules 3 of stripping solid material 4 for the said metal powder, is placed on a distributor plate 5 located in a container 6. The proportion between the nodules 1 of metal powder 2 and the nodules 3 of stripping solid material 4 is determined according to the nature of the metal powder and of the stripping solid material, the amount of oxides present at the surface of the nodules 1 of the metal powder 2 and the implementing conditions of the method according to the invention.

The mixing between the nodules 1 of metal powder 2 and the nodules 3 of stripping solid material 4 is carried out so that the nodules 3 of stripping solid material 4 are dispersed in the metal powder 2. The amount of stripping solid material 4 is determined according to the size of the nodules 1 of metal powder and according to the ease with which the nodules 3 of stripping solid material will pass into the gas phase during the implementation of the method according to the invention. This is because it is important for stripping solid material 4 vapour to come into contact with the whole of the surface of each of the nodules 1 of metal powder 2.

A carrier gas 7, for example argon, is injected under the distributor plate 5 by a feed pipe 8 comprising a member 9 for isolation and regulation of the carrier gas flow rate.

A means 10 makes it possible to bring the mixture composed of the nodules 1 of metal powder 2 and of the nodules 3 of stripping solid material 4 to the temperature necessary for the method according to the invention. It makes it possible to supply the heat which makes it possible to bring the stripping solid material to the temperature required in order to obtain the gasification thereof and to subsequently bring the stripping solid material 4 vapours obtained to the temperature desired in order to interact with the metal powder 2. This means 10 can, for example, be placed on the external walls of the container 6 and/or inside the container 6 under the distributor plate 5 and/or on the feed pipe. The means 10 can also be a combination of means placed in different places. It can, for example, be one or more electrical resistors. The container 6 and the feed pipe 8 are thermally insulated in order to prevent heat losses and to prevent any risk of burning to the operators. Advantageously, the carrier gas 7 is heated before it comes into contact with the mixture of nodules 1 of metal powder 2 and nodules 3 of stripping solid material 4.

The flow rate and the feed pressure of the carrier gas 7 are adjusted according to the amount and the height of the mixture of stripping solid material 4 and of metal powder 2 to be treated so as to ensure the buoyancy of the metal powder.

The distributor plate 5 has characteristics which allow the gas flow through the thickness thereof while keeping the stripping solid material 4 and the metal powder 2 on the top of its upper face. Its pressure drop makes it possible to ensure a good distribution of the flow of the carrier gas 7 over the whole of its lower face.

By circulating around the nodules 3 of stripping solid material 4, the carrier gas 7 facilitates the transportation of the stripping solid material 4 through the metal phase. The stripping solid material passes directly from the solid state to the gas state, without passing through an intermediate liquid state. The stripping solid material 4 is thus sublimed.

The intimate contact between the gas mixture and the metal powder 2 makes it possible to strip the surface of the metal nodules 1, eliminating any trace of oxides present at the surface of the said nodules 1. These oxides decompose to give gases entrained by the carrier gas and the balance of sublimed stripping solid material vapour.

There is found, in the upper part of the container 6, a pipe 11, equipped with an isolation organ 12, by which the gas mixture consisting of the carrier gas 7, of the products of the reaction between the vapours resulting from the sublimation of the stripping solid material and the oxides present at the surface of the nodules 1, and also of the excess vapours resulting from the sublimation of the stripping solid material which have not reacted with the metal oxides, escapes. The pipe 11 is connected to a means for collecting and cooling these gases, not represented in FIG. 1. A means for treatment of the gases collected at the outlet of the container 6 can be installed downstream of the pipe 11 so as to directly discharge these gases after decontamination. This means for treatment of the gases can be separated. In this case, the gases collected at the outlet of the container 6 are encapsulated for the subsequent treatment thereof.

Advantageously, the flow of the carrier gas 7 between the nodules 1 and 3 results in the formation of a fluidized bed.

The internal walls of the container 6 and the distributor plate 5 consist of or are covered with a material compatible with the stripping solid material 4 and/or gaseous material and with the temperature level to which these items of equipment are brought when the method according to the invention is carried out.

Once the operation is complete, the assembly is cooled and the container 6 is isolated by means of the organs 9 and 12. This container 6 can subsequently be used for feeding the machine which will make use of the metal powder 2 in an industrial process. According to an alternative form, the container 6 is subsequently placed in a chamber under a non-oxidizing atmosphere in which the metal powder is transferred into a container which will be closed in leaktight fashion after filling and subsequently used for feeding the machine which will make use of the metal powder in an industrial process.

Obviously, as the metal powder 2 is very oxygen hungry, it is essential that the powder be kept under a non-oxidizing atmosphere between the end of the method according to the invention and the use thereof in an industrial process for which the surface of the nodules 1 of metal powder 2 has to be devoid of oxides.

The mixing between the stripping solid material 4 and the metal powder 2 can be carried out immediately before the deposition of the mixture on the distributor plate 5 of the device according to the invention. It can also be carried out upstream, the mixture being prepared in a plant and delivered ready-for-use. Stripping solid material 4 powder and metal powder 2 can, for example, be mixed before the combination is ground in a high-energy or planetary mill or in an attrition mill, so as to obtain an intimate mixture between the two components.

According to an alternative embodiment, the stripping solid material 4 is not in the nodule form but covers the surface of the nodules 1 of the metal powder 2. In this case, only the metal powder 2 precoated with stripping solid material 4 is placed on the distributor plate 5 of the device according to the invention.

In an alternative embodiment of the invention, the stripping solid material 4 is not mixed with the metal powder 2. The stripping solid material 4 is first deposited on the distributor plate 5 and separated from the metal powder 2 by a sieve which allows the carrier gas and vapours obtained by sublimation of the stripping solid material to pass without, however, allowing the metal powder 2 to come into contact with the nodules 3 of stripping solid material 4.

According to another alternative embodiment of the invention, carrier gas 7 is not used. In this case, the stripping solid material 4 and the metal powder rest at the bottom of the container 6, the distributor plate 5 no longer being necessary. In this case, the vapour obtained by sublimation of the stripping solid material 4 naturally rises up through the metal powder 2.

Figure 2:
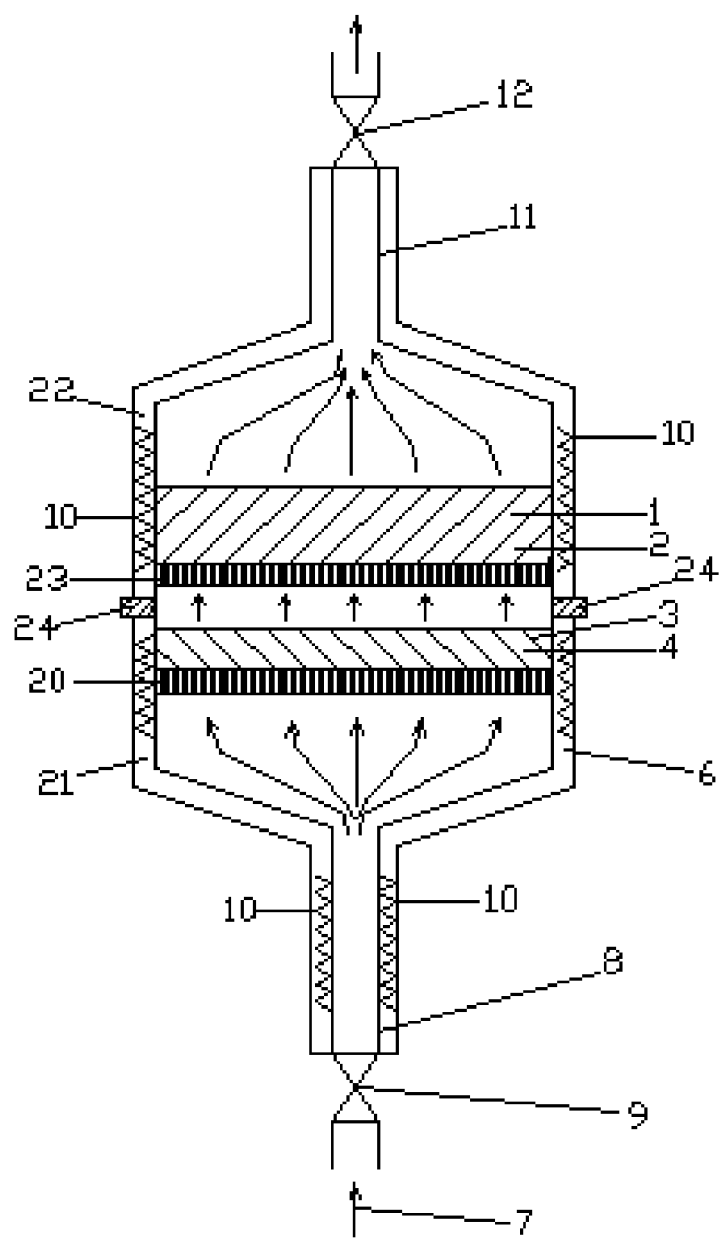
FIG. 2: diagrammatic representation of a second example of device according to the invention.

A second implementational example of the invention can be seen represented in FIG. 2. Stripping solid material 4 is placed above a distributor plate 20 in the lower part 21 of a container 6. The stripping solid material 4 takes, for example, the form of a powder or of pieces having larger dimensions. The container 6 is fed in its lower part with a carrier gas 7, for example argon. The distributor plate 20 provides the support of the stripping solid material 4 and the distribution of the carrier gas 7 over the whole of the section of the container 6.

In the upper part 22 of the container 6, metal powder 2 is placed above a second distributor plate 23. A means 24 makes it possible to provide the mechanical connection between the two parts 21 and 22 of the container 6 and the leaktightness of the connection.

A heating means 10 makes it possible to supply the heat necessary to bring the stripping solid material 4 to the temperature required in order to obtain the gasification thereof and to subsequently bring the vapours obtained by sublimation of the stripping solid material to the temperature desired in order to interact with the metal powder.

After having passed through the first distributor plate 20, the carrier gas 7 is mixed with the vapour obtained by sublimation of the stripping solid material 4. The gas mixture, thus consisting of a portion of carrier gas 7 and of a portion of sublimed stripping solid material 4, subsequently passes through the second distributor plate 23 on which the metal powder 2 is placed. Advantageously, the circulation of this gas mixture between the nodules 1 of the metal powder 2 forms a fluidized bed.

The two distributor plates 20 and 23 have the nature of allowing the gas flow to pass through the thickness thereof while holding the stripping solid material 4 for the distributor plate 20 and the metal powder 2 for the distributor plate 23. Their head loss makes it possible to ensure a good distribution of the gas flow over the whole of their section.

The carrier gas 7 is fed at a pressure sufficient to circulate between the inlet and the outlet of the container 6 despite the head loss resulting from the distributor plates 20 and 23, from the stripping solid material 4 and from the metal powder 2. An adjustment organ 9 makes it possible to regulate the flow rate of carrier gas 7.

There is found, in the upper part of the container 6, an outlet 11 by which the gas mixture consisting of the carrier gas 7, of the products of the reaction between the sublimed stripping solid material and the oxides present at the surface of the nodules 1, and also of the excess sublimed stripping solid material which has not reacted with the metal oxides, escapes.

According to an alternative embodiment of the invention, carrier gas 7 is not used. In this case, the stripping solid material 4 rests at the bottom of the container 6, the distributor plate 20 no longer being necessary. Only the vapour obtained by sublimation of the stripping solid material naturally passes through the distributor plate 23 on which the metal powder 2 rests.

Figure 3:
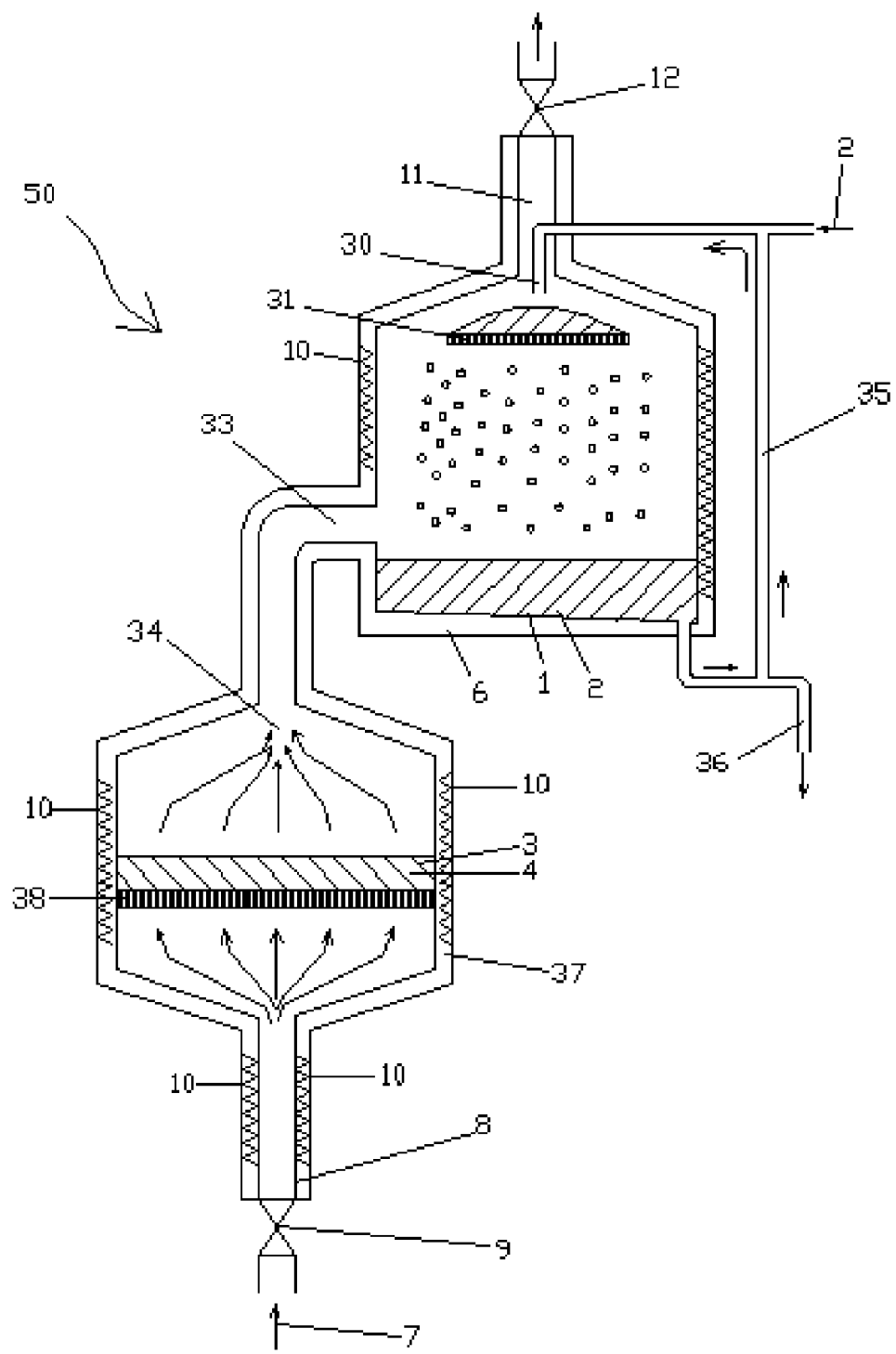
FIG. 3: diagrammatic representation of a third example of device according to the invention.

A third embodiment of the invention can be seen represented in FIG. 3. The metal powder 2 is continuously poured by an injector 30 onto a distributor plate 31 placed in the upper part of a container 37. Unlike the distributor plates 5, 20, 23 described in the preceding examples of embodiment, the distributor plate 31 makes it possible to allow the passage of the metal powder 2. This distributor plate 31 behaves somewhat like a shower head. The metal powder falls from the distributor plate 31 in the form of a rain of nodules 1 and will be deposited on the bottom of the container 6. In the bottom part of the container 6, at least one point 33 for injection of a mixture 34 of vapours obtained by sublimation of the stripping solid material and of a carrier gas 7 is located. This mixture 34 flows in the container 37 substantially from the bottom upward before exiting via an orifice 11 placed in the upper part of the container 37. The metal nodules 1 are thus placed in a gas stream comprising the flux 4 vapour, which will eliminate the oxides present at the surface of the nodules 1 of the metal powder 2. The height of the container 37 and the rate of flow of the mixture 34 in the said container 37 are determined in order for the duration of the fall of a metal nodule 1 in the container 37 to be sufficient for the vapours obtained by sublimation of the stripping solid material 4 to eliminate any trace of oxide at the surface of the said nodule. The mixture 34 originates from a container 37 in which stripping solid material 4, positioned on a distributor plate 38 traversed by a flow of carrier gas 7, is sublimed by the heat supplied by a heating means 10.

In embodiments of the invention described above, the atmosphere present in the device is advantageously rendered non-oxidizing before the start of the implementation of the method according to the invention, for example by placing under partial vacuum or by flushing for a sufficient period of time with an inert gas or by joint action.

The method according to the invention can also be directly implemented in the machine in which the industrial process using the metal powder 2 is carried out.

For example, the method according to the invention can advantageously be carried out in an additive manufacturing machine. The said machine can be fed with leaktight containers containing preactivated powder according to the invention. It can also contain a device 50 according to the invention for carrying out in situ the activation of the powder according to the method of the invention.

Numerous developments have taken place in recent years in the additive manufacture of 3-dimensional parts from a metal powder or from a mixture of metal powders. This method of manufacture consists in fusing successive layers of powder above those, fused and solidified, added beforehand. According to alternative embodiments, the powder is either, on the one hand, deposited in the form of a layer above a powder bed containing the first courses of the part already fused and solidified, before being fused, for example according to the methods of selective fusion by laser or by electron beam, or, on the other hand, already fused when it is deposited on the substrate, for example according to the method of direct manufacture by laser or electron beam. In this case, the metal powder is injected in a nozzle in order to form a homogeneous jet which traverses, for example, a laser beam which will melt the powder before it is deposited on the substrate.

However, the additive manufacture of a part made of materials which are very oxygen hungry, such as, for example, aluminium and some of its alloys having low contents of alloy elements, is very difficult as a result of the layer of oxides which covers the surface of the nodules of the metal powder. The invention makes it possible to overcome this problem by making possible the use of metal powders not covered with a layer of oxides.

For an additive manufacturing machine, the metal powder can be treated according to the invention, either before the deposition of the first layer of powder on the working platform or during and/or after the deposition of each layer of powder. In the case where the stripping of the metal powder is carried out during and/or after the deposition of each layer of powder, the platform on which the part is produced constitutes the distributor plate 5, 23 according to the embodiments of the invention represented in FIG. 1 and FIG. 2. To carry out this operation during or after the deposition of the layer of metal powder requires that the flushing of the gas stream does not lead to excessive displacement of powder at the surface of the deposited layer, which is liable to harm the evenness of the surface and the thickness of the layer. In order to avoid this difficulty, it can be advantageous to bring the metal powder 2 into contact with the flux 4 vapour before the deposition of the layer.

This operation of stripping the metal powder can be carried out in just one operation for the whole of the metal powder necessary for the production of a part, in portions of the total amount of powder which are successively treated one after the other, or in portions of the total amount of powder which are treated continuously. In these last two cases, the flushing of the metal powder by the gas flow is carried out in a metal powder container of restricted volume placed as close as possible to the working zone and downstream of a metal powder container of greater size, in the direction of flow of the metal powder. The treatment in this container with a restricted volume can facilitate the flushing of the metal powder by the sublimed stripping solid material.

According to an illustrative implementational example of the invention according to FIG. 2, for the treatment of a metal powder 2 made of Al3003 aluminium, the interior surface of the container 21 is coated with aluminium and the distributor plates 20 and 23 are made of aluminium alloy. The carrier gas 7 is argon and the flux 4 is $NH_4F$. The argon is brought to a temperature of 200° C. upstream of the distributor plate 20. The stripping solid material is also brought to a temperature of 200° C. in order to cause it to sublime. The sublimed stripping solid material then reacts with the walls of the distributor plate to form $AlF$ and $AlF_3$, the latter being the more stable.

The sublimed stripping solid material reacts with the aluminium oxides $Al_2O_3$ located at the surface of the metal nodules according to the reaction $2NH_4F \rightarrow N_2 + 4H_2 + F_2$; $3F_2 + Al_2O_3 \rightarrow \frac{3}{2}O_2 + 2AlF_3$.

The metal powder is also maintained at a temperature of approximately 200° C. This relatively low temperature makes it possible to avoid any risk that the aluminium nodules, freed from their alumina layer, will stick to one another.

The gaseous effluents collected at the outlet 26 of the chamber 6 are treated with lime in order to neutralize the fluorides.

The invention claimed is:

1. A method for removing surface oxides present on nodules of a metal powder to be used in an industrial process in which the nodules of the metal powder are assembled by a solid route or a liquid route, the method comprising:
   creating a vapour by at least one of sublimating a stripping solid material and sublimating a stripping solid material followed by a chemical transformation of a product of the sublimation;
   stripping surface oxides off of nodules of a metal powder by bringing the nodules of the metal powder into contact with the vapours; and
   circulating a carrier gas between the nodules of the metal powder such that the carrier gas and the nodules of the metal powder form a fluidized bed.

2. The method according to claim 1, wherein:
   the stripping solid material is $NH_4F$, and
   the stripping solid material is brought to a temperature of approximately 200° C. in order to sublimate the stripping solid material.

3. The method according to claim 1, wherein:
   the stripping solid material is $K_3AlF_6$—$KAlF_4$, and
   the stripping solid material is brought to a temperature of approximately 400° C. in order to sublimate the stripping solid material.

4. The method according to claim 1, wherein the vapour is entrained by the carrier gas.

5. The method according to claim 1, wherein the method is carried out in an additive manufacturing machine.

6. The method according to claim 5, further comprising depositing a layer of powder on a distributor plate, wherein the stripping step is performed before, during, or after depositing the layer of powder.

7. The method according to claim 5, further comprising depositing a layer of powder on a distributor plate, wherein the stripping step is performed during and after depositing the layer of powder.

8. The method according to claim 1, further comprising collecting gases exiting an outlet of a container in a gas collector, the gas collector being structured to confine the gases for later neutralization of pollution components of the gases.

9. A method for removing surface oxides present on nodules of a metal powder to be used in an industrial process in which the nodules of the metal powder are assembled by a solid route or a liquid route, the method comprising:

creating a vapour by sublimating a stripping solid material, wherein the stripping solid material is $NH_4F$ and the stripping solid material is brought to a temperature of approximately 200° C. in order to sublimate the stripping solid material; and stripping surface oxides off of nodules of a metal powder by bringing the nodules of the metal powder into contact with the vapour.

10. The method according to claim 9, wherein, in the stripping the surface oxides, a carrier gas circulates between the nodules of the metal powder such that the carrier gas and the nodules of the metal powder form a fluidized bed.

11. The method according to claim 9, wherein the method is carried out in an additive manufacturing machine.

12. A method for removing surface oxides present on nodules of a metal powder to be used in an industrial process in which the nodules of the metal powder are assembled by a solid route or a liquid route, the method comprising:

creating a vapour by at least one of sublimating a stripping solid material and sublimating a stripping solid material followed by a chemical transformation of a product of the sublimation; and stripping surface oxides off of nodules of a metal powder by bringing the nodules of the metal powder into contact with the vapour, wherein the method is carried out in an additive manufacturing machine.

13. The method according to claim 12, wherein:

the stripping solid material is $NH_4F$, and the stripping solid material is brought to a temperature of approximately 200° C. in order to sublimate the stripping solid material.

14. The method according to claim 12, wherein:

the stripping solid material is $K_3AlF_6$—$KAlF_4$, and the stripping solid material is brought to a temperature of approximately 400° C. in order to sublimate the stripping solid material.

* * * * *